United States Patent
Li et al.

(10) Patent No.: US 10,316,184 B2
(45) Date of Patent: Jun. 11, 2019

(54) LOW PRINTING TEMPERATURE FILAMENTS FOR 3D PRINTING

(71) Applicant: Nano and Advanced Materials Institute Limited, Hong Kong (HK)

(72) Inventors: Jifan Li, Hong Kong (HK); Kai Li, Hong Kong (HK); Li Lu, Hong Kong (HK)

(73) Assignee: NANO AND ADVANCED MATERIALS INSTITUTE LIMITED, Hong Kong (HK)

( * ) Notice: Subject to any disclaimer, the term of this patent is extended or adjusted under 35 U.S.C. 154(b) by 323 days.

(21) Appl. No.: 15/396,388

(22) Filed: Dec. 30, 2016

(65) Prior Publication Data

US 2018/0187000 A1    Jul. 5, 2018

(51) Int. Cl.
| | | |
|---|---|---|
| *C08L 67/04* | (2006.01) | |
| *B29C 67/00* | (2017.01) | |
| *B33Y 10/00* | (2015.01) | |
| *B33Y 70/00* | (2015.01) | |
| *B29C 64/106* | (2017.01) | |
| *B29K 67/00* | (2006.01) | |
| *B29K 23/00* | (2006.01) | |
| *B29K 105/00* | (2006.01) | |

(52) U.S. Cl.
CPC ............ *C08L 67/04* (2013.01); *B29C 64/106* (2017.08); *B33Y 10/00* (2014.12); *B33Y 70/00* (2014.12); *B29K 2023/06* (2013.01); *B29K 2023/083* (2013.01); *B29K 2067/00* (2013.01); *B29K 2105/0038* (2013.01); *B29K 2995/006* (2013.01)

(58) Field of Classification Search
None
See application file for complete search history.

(56) References Cited

U.S. PATENT DOCUMENTS

| | | |
|---|---|---|
| 5,051,476 A | 9/1991 | Uji et al. |
| 2016/0038655 A1 | 2/2016 | Weisman et al. |

FOREIGN PATENT DOCUMENTS

| | | |
|---|---|---|
| CN | 103980682 A | 8/2014 |
| CN | 105504711 A | 4/2016 |

(Continued)

OTHER PUBLICATIONS

Dow ENGAGE Polyolefin Elastomers Product Selection Guide (2015). (Year: 2015).*

(Continued)

*Primary Examiner* — Catherine S Branch
(74) *Attorney, Agent, or Firm* — Idea Intellectual Limited; Margaret A. Burke; Sam T. Yip

(57) ABSTRACT

A low printing temperature thermoplastic filament composition for fused filament fabrication 3D printing is described. The filament includes polycaprolactone in an amount from 70 to 90 wt %, at least one thermoplastic polymer having a melting temperature between approximately 60° C. and approximately 90° C. in an amount from approximately 10 to 30 wt %, at least one antioxidant, and at least one plasticizing agent. This 3D printing filament can be printed out at temperatures below 100° C. and no heated print bed is needed, which saves energy and minimizes the complexity of 3D printer. Besides the low printing temperature, this 3D printing material is bio-friendly which makes it safe for household use.

34 Claims, 1 Drawing Sheet

(56) References Cited

FOREIGN PATENT DOCUMENTS

CN 105713362 A * 6/2016
JP 11-130920 A 5/1999

OTHER PUBLICATIONS

Dupont Elvax EVA copolymer resins Grade Selection Guide (2015). (Year: 2015).*
Perstorp Capa 6400 Product Data Sheet (2013). (Year: 2013).*
BASF Irgafos 168 Technical Datasheet (2018). (Year: 2018).*
Machine translation of CN 105713362 A. (Year: 2016).*

* cited by examiner

LOW PRINTING TEMPERATURE FILAMENTS FOR 3D PRINTING

FIELD OF THE INVENTION

The present invention relates to low printing temperature filaments for three-dimensional (3D) printing and to a method of 3D printing using the low printing temperature filaments.

BACKGROUND

Three-dimensional (3D) printing is an additive manufacturing process in which two-dimensional cross-sectional layers of a product are sequentially deposited to create a three-dimensional final product shape. 3D printers have created a new generation of do-it-yourself (DIY) manufacturers and household users. These individuals are using low-cost 3D printers to create custom products that address unmet needs since the 3D printers make it economical to create highly unique or personalized products. Many affordable 3D printers in the consumer market mean that ordinary households can realistically own a 3D printer, exposing 3D printer use to novice hobbyists. The other advantages of 3D include abundant and economic material supply (thermoplastic polymers), relatively simple printing technology (XYZ with a heating head), and reasonable durability of the finished products.

Among 3D printing technologies, fused filament fabrication is the most common, especially for home use, because fused filament printers often come at a low price point. A stream of melted thermoplastic material is extruded from a nozzle/print head to create layers, with each layer bonding to the previous layer. The nozzle/print head operates under computer control, typically moving in two dimensions to deposit sequential layers with each layer being a two-dimensional segment of a three-dimensional product. A third direction may be used by the printing head as it moves to print a subsequent layer.

The printing materials used for fused filament fabrication are filaments of thermoplastic polymers, typically at a dimension of 1.75 mm for extrusion through a nozzle opening ranging from 0.15 to 0.8 mm. The most common thermoplastic polymers used are acrylonitrile butadiene styrene (ABS) and polylactic acid (PLA).

ABS has been a fundamental material for fused filament fabrication for many years. Measured by annual consumption, it is the most widely used material in fused filament 3D printers. The ABS material is an excellent choice for models, prototypes, patterns, tools and end-use parts since they are sufficiently resistant to heat, chemicals, and moisture. Printers able to process ABS plastics normally operate with a hot end (the heated part melting the plastic, before it is forced through the print nozzle) at a temperature around 210-250° C. ABS is generally available in white, black, red, blue yellow and green colors or transparent and has a matte appearance.

PLA is a biodegradable thermoplastic polymer created from plant sugars from crops such as tapioca, corn, and sugarcane. This makes PLA the most environmentally friendly solution in the domain of 3D printing, compared to all the other petrochemical-based plastics like ABS. PLA is used for example in medical suturing as well as surgical implants. PLA is tough, but a little brittle, once it has cooled down. Its temperature threshold is lower than the one of ABS, as PLA is normally extruded around 190° C.-220° C.

The extruded filament is deposited onto a printing bed. The printing bed may be a fixed or movable table that is capable of being heated. Typically, the printing bed is heated to a temperature just below the melting point of the extruded filament being deposited. This ensures that each deposited layer fuses with the previously-deposited layers and prevents warping or cracking of the product being deposited.

However, materials such as ABS and PLA require relatively high printing temperatures and relatively high printing bed temperatures due to their melting temperatures of approximately 210-240° C. and approximately 180-220° C., respectively. This can make the fused filament 3D printers expensive to operate in terms of power consumption. Also the high printing and printing bed temperatures required may be hazardous to novice hobbyists and children.

Due to the high temperatures involved with conventional 3D printing materials, there is a need in the art for improved 3D printing materials which have low printing temperatures so as to provide a safe environment to the users.

SUMMARY OF THE INVENTION

A biocompatible 3D printing material which can be printed out at very low temperature is presented. The material is based on a biodegradable polymer, polycaprolactone (PCL). Through mixing with a low melting point polymer, such as ethylene-vinyl acetate (EVA) or polyethylene glycol (PEG), a 3D printing filament composition has very low printing temperature and no heated print bed is needed during printing.

DETAILED DESCRIPTION

Figure 1:
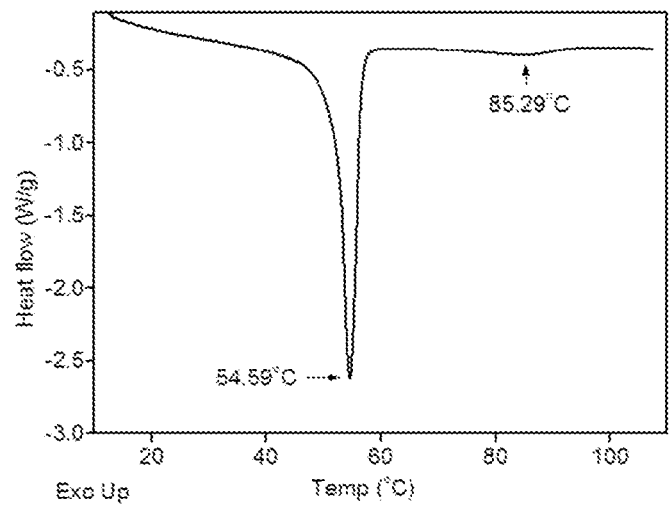
FIG. 1 depicts a differential scanning calorimetry (DSC) curve showing the melting characteristics of the filament of Example 1.

A biocompatible 3D printing material is described which can be printed out at low temperatures. This material is a mixture of a biodegradable polymer, a low melting temperature polymer, an antioxidant, and a plasticizer.

Base polymer: Polycaprolactone (PCL): Polycaprolactone is a synthetic biodegradable polyester. The polycaprolactone used in the compositions of the present invention has a glass transition temperature (Tg) of −60° C. and melting point ranging between 59 and 64° C. The molecular weight of the polycaprolactone is selected to be between about 30,000 to about 150,000. Polycaprolactone is used in the filament composition in an amount ranging from approximately 70 wt % to approximate 90 wt %. Although polycaprolactone has been used in 3D printing, it is subject to warping when used on its own. As a result, commercial compositions may rely on particulate fillers to combat the warping tendency of polycaprolactone. These particulate fillers increase difficulty in making filaments and thus the expense of the resultant material and may also increase the printing temperature required.

Low melting temperature polymer: A low melting temperature polymer, having a melting temperature between approximately 60° C. and approximately 100° C. is used in connection with the polycaprolactone main constituent. It is noted that the low melting point polymer generally has a higher melting temperature than the polycaprolactone and, as such, slightly raises the melting temperature of the filament composition. The low melting point polymer may be included in the filament composition in an amount from approximately 10 wt % to approximately 30 wt %. One low melting temperature polymer that may be used is ethylene-vinyl acetate, a copolymer of ethylene and vinyl acetate. In the ethylene-vinyl acetate used in the filaments of the present invention, vinyl acetate is present in an amount from about 10 wt % to about 20 wt %. The melting temperature of the ethylene-vinyl acetate is typically between 60 and 90° C.

Another low melting temperature polymer that may be used is polyethylene glycol. Based on a selected molecular weight of about 5,000 to about 15,000 the selected polyethylene glycol has a melting temperature between 60 and 70° C.

Antioxidant: The heat and shear stress generated during 3D printing may result in chemical reactions that lead to polymer degradation such as a loss of strength and other mechanical properties. To lessen the effects of the heat and shear stress of 3D printing, the 3D filaments of the present invention incorporate antioxidants in an amount ranging from about 0.3 wt %-1 wt %. The antioxidants may be selected from pentaerythrite tetra-[β-(3,5-di-tert-butyl-4-hydroxyphenyl)-propionate] (antioxidant 1010), octadecyl 3-(3,5-di-tert-butyl-4-hydroxyphenyl) propionate (antioxidant 1076), or a combination of either or both antioxidants with tris-(2,4-di-tert-butylphenyl) phosphite (antioxidant 168). In particular, a combination antioxidant that is 67% tris-(2,4-di-tert-butylphenyl) phosphite and 33% pentaerythrite tetra-[β-(3,5-di-tert-butyl-4-hydroxyphenyl)-propionate] may be used (antioxidant B215).

Plasticizer: In order to assist in making filament, a plasticizer is added in an amount from about 0.1 wt % to about 1 wt %. The plasticizer may be selected from a white oil, a silicone oil, and polyethylene wax.

Production of a 3D printing filament: The polycaprolactone, low melting temperature polymer, antioxidant, and plasticizer may be melt mixed by heating to a temperature ranging from 110° C. to 130° C. depending upon the selected composition. The melted material may be cooled and pelletized to create a raw material for creation of filaments. The filaments may be formed by extrusion, typically to a diameter of 1.75 mm for use in most commercially-available 3D printers.

Printing: Through adjusting the ratio of polycaprolactone to the low melting temperature polymer with different melting temperatures, the printing temperature of the developed 3D printing filament can be fine-tuned. The 3D printing filament made of the polycaprolactone mixture is typically formed onto a feed spool for feeding to a 3D printer. The filaments can be printed out in commercially available fused filament 3D printers smoothly at a temperature at or below approximately 100° C. without use of a heated print bed. The detailed examples are shown below. In the examples below, a commercially-available ZMorph fused filament 3D printer is used. The printer uses filament in a diameter of 1.75 mm with a single extruder head having an output diameter of 0.4 mm. The printing speeds for both X and Y directions is 200 mm/s, Z direction is 20 mm/s and E direction is 5 mm/s. The layer height is selected as 0.2 mm with an infill ratio of 40% in a rectilinear infill type.

Example 1

Figure 2:
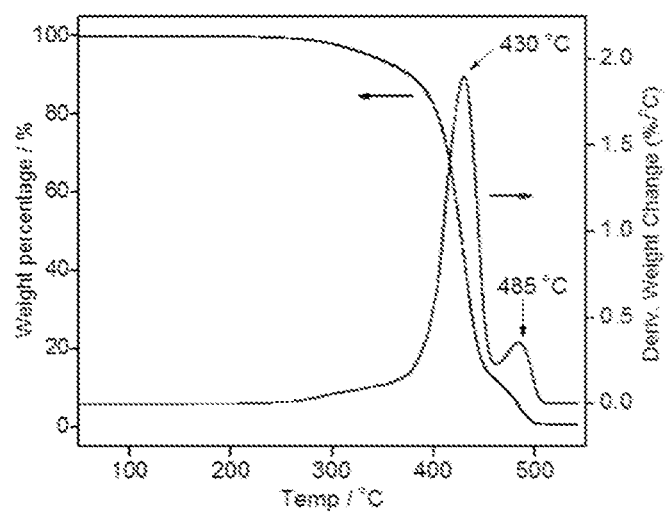
FIG. 2 depicts a thermogravimetric analysis (TGA) curve showing the decomposition process of filament of Example 1.

The polycaprolactone and a low melting point polymer of ethylene-vinyl acetate were dried at 40° C. for 4 hours. After that, a mixture of polycaprolactone (79.3 wt %), the low melting polymer with a melting point of 80-90° C. (20 wt %), antioxidant B215 (0.5 wt %), and plasticizer white oil (0.2 wt %) was heated at 130° C. to melt-mix, then cooled and pelletized. The pellets were then extruded through a single screw extruder at 115° C. to obtain a filament with 1.75 mm diameter. The fabricated filament was printed using a fused filament fabrication 3D printer and its printing temperature and the temperature of the printing bed is shown in Table 1. FIG. 1 depicts a differential scanning calorimetry (DSC) curve showing the melting characteristics of the prepared filament. FIG. 2 depicts a thermogravimetric analysis (TGA) curve showing the decomposition process of the prepared filament.

Example 2

The polycaprolactone and a low melting point polymer of ethylene-vinyl acetate were dried at 40° C. for 4 hours. After that, a mixture of polycaprolactone (78.5 wt %), the low melting point polymer having a melting point of 60-70° C. (20 wt %), antioxidant B215 (0.5 wt %), and plasticizer polyethylene wax (1 wt %) was heated at 110° C. to melt-mix, then cooled and pelletized. The pellets were then extruded through a single screw extruder at 80° C. to obtain a filament with 1.75 mm diameter. The fabricated filament was printed using a fused filament fabrication 3D printer and its printing temperature is shown in Table 1.

Example 3

The polycaprolactone and a low melting point polymer of polyethylene glycol were dried at 40° C. for 4 hours. After that, a mixture of polycaprolactone (79 wt %), the low melting polymer having a melting point of 60-70° C. (20 wt %), antioxidant B215 (0.5 wt %), and plasticizer polyethylene wax (0.5 wt %) was heated at 110° C. to melt-mix, then cooled and pelletized. The pellets were then extruded through a single screw extruder at 100° C. to obtain a filament with 1.75 mm diameter. The fabricated filament was printed using a fused filament 3D printer and its printing temperature is shown in Table 1.

Example 4

The polycaprolactone and a low melting point polymer of ethylene-vinyl acetate were dried at 40° C. for 4 hours. After that, a mixture of polycaprolactone (69 wt %), the low melting polymer having a melting point of 60-70° C. (30 wt %), antioxidant B215 (0.5 wt %), and plasticizer white oil (0.5 wt %) was heated at 110° C. to melt-mix, then cooled and pelletized. The pellets were then extruded through a single screw extruder at 95° C. to obtain a filament with 1.75 mm diameter. The fabricated filament was printed using a fused filament 3D printer and its printing temperature is shown in Table 1.

TABLE 1

| | Printing temperature of low printing temperature 3D printing filament | | |
|---|---|---|---|
| Example | Printing temperature | Temperature of printing bed | Sample warping |
| 1 | 90° C. | 25° C. | None |
| 2 | 90° C. | 25° C. | None |

TABLE 1-continued

Printing temperature of low printing temperature 3D printing filament

| Example | Printing temperature | Temperature of printing bed | Sample warping |
|---|---|---|---|
| 3 | 95° C. | 25° C. | None |
| 4 | 97° C. | 30° C. | None |

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the specification, and following claims.

The invention claimed is:

1. A low printing temperature three-dimensional printing filament comprising:
    polycaprolactone in an amount of 70 to 90 weight percent;
    at least one low melting point polymer;
    at least one antioxidant;
    at least one plasticizing agent.

2. The low printing temperature three-dimensional printing filament of claim 1, wherein the polycaprolactone has a molecular weight of 30,000 to 150,000.

3. The low printing temperature three-dimensional printing filament of claim 1, wherein the weight percentage of the low melting temperature polymer is 10% to 30%.

4. The low printing temperature three-dimensional printing filament of claim 1, wherein the melting temperature of the low melting temperature polymer is between 60° C. to 100° C.

5. The low printing temperature three-dimensional printing filament of claim 1, wherein the low melting temperature polymer is selected from ethylene-vinyl acetate (EVA) or polyethylene glycol (PEG).

6. The low printing temperature three-dimensional printing filament of claim 1, wherein the weight percentage of the antioxidant is 0.3%-1%.

7. The low printing temperature three-dimensional printing filament of claim 1, wherein the antioxidant is selected from the group consisting of pentaerythrite tetra-[β-(3,5-di-tert-butyl-4-hydroxyphenyl)-propionate], octadecyl 3-(3,5-di-tert-butyl-4-hydroxyphenyl) propionate, tris-(2,4-di-tert-butylphenyl) phosphite and mixtures thereof.

8. The low printing temperature three-dimensional printing filament of claim 1, wherein the weight percentage of the plasticizing agent is about 0.1% to about 1%.

9. The low printing temperature three-dimensional printing filament of claim 1, wherein the plasticizing agent is selected from the group consisting of white oil, silicone oil, and polyethylene wax.

10. A method of three-dimensional fused filament printing comprising:
    heating a filament to a temperature below approximately 100° C. in a three-dimensional fused filament fabrication printer, the filament comprising at least one polycaprolactone in an amount of 70 to 90 weight percent, at least one thermoplastic polymer having a melting temperature between approximately 60° C. and approximately 100° C., at least one antioxidant, and at least one plasticizing agent;
    extruding the filament through a printer head;
    depositing the extruded filament on an unheated printing bed in layers to form a three-dimensional product.

11. The method of three-dimensional fused filament printing of claim 10, wherein the polycaprolactone has a molecular weight of 30,000 to 150,000.

12. The method of three-dimensional fused filament printing of claim 10, wherein the weight percentage of the low melting temperature polymer is 10% to 30%.

13. The method of three-dimensional fused filament printing of claim 10, wherein the low melting temperature polymer is selected from the group consisting of ethylene-vinyl acetate (EVA) and polyethylene glycol (PEG).

14. The method of three-dimensional fused filament printing of claim 10, wherein the weight percentage of the antioxidant is 0.3%-1%.

15. The method of three-dimensional fused filament printing of claim 10, wherein the antioxidant is selected from the group consisting of pentaerythrite tetra-[β-(3,5-di-tert-butyl-4-hydroxyphenyl)-propionate], octadecyl 3-(3,5-di-tert-butyl-4-hydroxyphenyl) propionate, tris-(2,4-di-tert-butylphenyl) phosphite and mixtures thereof.

16. The method of three-dimensional fused filament printing of claim 10, wherein the weight percentage of the plasticizing agent is about 0.1% to about 1%.

17. The method of three-dimensional fused filament printing of claim 10, wherein the plasticizing agent is selected from the group consisting of white oil, silicone oil, and polyethylene wax.

18. A low printing temperature three dimensional printing filament comprising:
    polycaprolactone;
    at least one low melting point polymer in an amount from 10 to 30 weight percent;
    at least one antioxidant;
    at least one plasticizing agent.

19. The low printing temperature three-dimensional printing filament of claim 18, wherein the polycaprolactone has a molecular weight of 30,000 to 150,000.

20. The low printing temperature three-dimensional printing filament of claim 18, wherein the melting temperature of the low melting temperature polymer is between 60° C. to 100° C.

21. The low printing temperature three-dimensional printing filament of claim 18, wherein the low melting temperature polymer is selected from the group consisting of ethylene-vinyl acetate (EVA) and polyethylene glycol (PEG).

22. The low printing temperature three-dimensional printing filament of claim 18, wherein the weight percentage of the antioxidant is 0.3%-1%.

23. The low printing temperature three-dimensional printing filament of claim 18, wherein the antioxidant is selected from the group consisting of pentaerythrite tetra-[β-(3,5-di-tert-butyl-4-hydroxyphenyl)-propionate], octadecyl 3-(3,5-di-tert-butyl-4-hydroxyphenyl) propionate, tris-(2,4-di-tert-butylphenyl) phosphite and mixtures thereof.

24. The low printing temperature three-dimensional printing filament of claim 18, wherein the weight percentage of the plasticizing agent is about 0.1% to about 1%.

25. The low printing temperature three-dimensional printing filament of claim 18, wherein the plasticizing agent is selected from the group consisting of white oil, silicone oil, and polyethylene wax.

26. The low printing temperature three-dimensional printing filament of claim 18, wherein the amount of the polycaprolactone is 70 to 90 weight percent.

27. A method of three-dimensional fused filament printing comprising:

heating a filament to a temperature below approximately 100° C. in a three-dimensional fused filament fabrication printer, the filament comprising at least one polycaprolactone, at least one thermoplastic polymer having a melting temperature between approximately 60° C. and approximately 100° C. in an amount from 10 to 30 weight percent, at least one antioxidant, and at least one plasticizing agent;

extruding the filament through a printer head;

depositing the extruded filament on an unheated printing bed in layers to form a three-dimensional product.

28. The method of three-dimensional fused filament printing of claim 27, wherein the polycaprolactone has a molecular weight of 30,000 to 150,000.

29. The method of three-dimensional fused filament printing of claim 27, wherein the amount of the polycaprolactone is 70 to 90 weight percent.

30. The method of three-dimensional fused filament printing of claim 27, wherein the low melting temperature polymer is selected from the group consisting of ethylene-vinyl acetate (EVA) and polyethylene glycol (PEG).

31. The method of three-dimensional fused filament printing of claim 27, wherein the weight percentage of the antioxidant is 0.3%-1%.

32. The method of three-dimensional fused filament printing of claim 27, wherein the antioxidant is selected from the group consisting of pentaerythrite tetra-[β-(3,5-di-tert-butyl-4-hydroxyphenyl)-propionate], octadecyl 3-(3,5-di-tert-butyl-4-hydroxyphenyl) propionate, tris-(2,4-di-tert-butylphenyl) phosphite and mixtures thereof.

33. The method of three-dimensional fused filament printing of claim 27, wherein the weight percentage of the plasticizing agent is about 0.1% to about 1%.

34. The method of three-dimensional fused filament printing of claim 27, wherein the plasticizing agent is selected from the group consisting of white oil, silicone oil, and polyethylene wax.

* * * * *